(12) United States Patent
Zhang

(10) Patent No.: US 7,065,463 B2
(45) Date of Patent: Jun. 20, 2006

(54) YIELD PERCENTAGE MANAGING METHOD AND APPARATUS, AND COMPUTER-READABLE STORAGE MEDIUM

(75) Inventor: Xin Zhang, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 151 days.

(21) Appl. No.: 10/749,550

(22) Filed: Jan. 2, 2004

(65) Prior Publication Data

US 2004/0153190 A1  Aug. 5, 2004

(30) Foreign Application Priority Data

Jan. 27, 2003 (JP) ............................. 2003-017468

(51) Int. Cl.
G06F 19/00 (2006.01)
(52) U.S. Cl. ..................................... 702/101
(58) Field of Classification Search ................. 702/101
See application file for complete search history.

(56) References Cited

FOREIGN PATENT DOCUMENTS

JP         5-073573        3/1993

OTHER PUBLICATIONS

Translation of JP 05-073573, Sep. 1991.*

* cited by examiner

*Primary Examiner*—John Barlow
*Assistant Examiner*—Cindy D. Khuu
(74) *Attorney, Agent, or Firm*—Staas & Halsey LLP

(57) ABSTRACT

A yield percentage managing method manages a yield percentage of a target processed product with respect to at least one target raw material by use of a computer. The yield percentage managing method corrects or updates the yield percentage based on a processed amount K which indicates a total number or weight of target items of the target processed product processed from the target raw material.

12 Claims, 10 Drawing Sheets

FIG.11

| RAW MATERIAL | PROCESSED PRODUCT | YIELD PERCENTAGE |
|---|---|---|
| TUNA | TUNA SLICES | 90% |
| | CHUTORO SASHIMI | 80% |
| | OTORO SASHIMI | 85% |
| | MINCED TUNA | 98% |

FIG.12

| RAW MATERIAL | PROCESSED PRODUCT | COMPOSITION RATIO | YIELD PERCENTAGE |
|---|---|---|---|
| SQUID | SASHIMI PLATE | 40% | 60% |
| TUNA | | 60% | 85% |

YIELD PERCENTAGE MANAGING METHOD AND APPARATUS, AND COMPUTER-READABLE STORAGE MEDIUM

BACKGROUND OF THE INVENTION

This application claims the benefit of a Japanese Patent Application No. 2003-017468 filed Jan. 27, 2003, in the Japanese Patent Office, the disclosure of which is hereby incorporated by reference.

1. Field of the Invention

The present invention generally relates to yield percentage managing methods and apparatuses and computer-readable storage media, and more particularly to a yield percentage managing method and a yield percentage managing apparatus for automatically managing a yield percentage which indicates an amount of processed (or manufactured) products (or goods) that can be processed or manufactured from raw materials, and to a computer-readable storage medium which stores a computer program for causing a computer to manage the yield percentage.

In retail business and the like, raw materials are bought and processed so as to produce processed products, and the processed products are sold. Examples of such processed products are fishery products such as fishcakes (or so-called surimi products), and livestock products such as bacon and ham. When producing the processed products from the raw materials, there are portions of the raw materials that can be used and portions which cannot be used for the processed products. For example, if the raw material is a fish, the meat can be used to produce the fishcake, but the skin, bone and other portions of the fish cannot be used for the fishcake. In addition, when producing a package of raw fish slices, that is, the so-called sashimi slices, some portions of the meat cannot be used for the raw fish slices and are wasted depending on how the fish is cut.

In this specification, the "yield percentage" refers to a percentage of the raw material that is usable to produce the processed products, and is dependent on the portions of the raw material, the manner in which the raw material is cut and the like. In addition, the "processed products" refer to the products (goods, merchandises and the like) that are produced by processing the raw materials. Furthermore, the "processing" of the raw material includes subjecting the raw material to a process such as heating (baking, frying, steaming and the like), cutting and the like.

2. Description of the Related Art

The yield percentage is used to manage the purchasing budget, the ordering of the stock, the cost of the processed products and the like. By use of the yield percentage, it is possible, for example, to know the amounts of raw materials to be ordered by converting the target processed products to be sold to the raw materials. Accordingly, if an accurate yield percentage can be managed, it is possible to improve the accuracy of ordering the raw materials. In addition, it is possible to prevent ordering an excessive amount of raw material, which would otherwise cause a loss by having to destroy the excessive raw material or, cause unnecessary expenses to maintain the stock of the excessive raw material. Moreover, it is possible to prevent ordering too little amount of raw material, which would otherwise cause the processed products to be sold out and miss the opportunity of selling the processed products.

The yield percentage also changes depending on the individual worker or the number of workers who process the raw materials to produce the processed products. For this reason, in order to optimize management of the purchasing budget, the ordering of the stock, the cost of the processed products and the like, it is desirable to carry out the management so that the yield percentage is constantly corrected or updated to suit the situation.

FIG. 1 is a diagram for explaining a conventional method of managing the yield percentage. Conventionally, in order to manage the yield percentage, it was necessary to obtain the information shown in FIG. 1, for example. In FIG. 1, the left ordinate indicates the amount of material in arbitrary units, the right ordinate indicates the amount of sold items, and the abscissa indicates the selling time in arbitrary units. The material corresponds to the raw material, and the items correspond to the processed products. The amount of material may be the number of materials or, the weight of the material. For the sake of convenience, it is assumed that one kind of item is produced from one kind of target material.

In FIG. 1, M denotes an amount of initial stock of the target material, N denotes a buying amount of the target material, L denotes an amount of final stock of the target material, P denotes an amount of the target material used during the present term, p1 denotes an amount of sold target items, p2 denotes an amount of destroyed target items, p3 denotes an amount of present stock of the target item (an amount of unsold target items which can be sold), p4 denotes an amount of initial stock of the target material which is obtained as a result of a previous stocktaking of the target items, and p5 denotes an amount of stock of the target material which is obtained as a result of a stocktaking of the target items made during the present term. The amount M of initial stock of the target material is obtained as a result of a previous stocktaking of the target material. The buying amount N of the target material is the amount of the bought target material which is allocated when the buying of the target material becomes definite. The amount L of final stock of the target material is the amount of the target material which is presently in stock as a result of the stocktaking of the target material. The amount P of the target material used during the present term is the amount of the target material which is actually used to produce the target items, of the amount M+N, and includes the amount of the target material which is not used for the target items but is destroyed.

For example, the yield percentage of the target item with respect to the target material is managed in the following manner. First, the amount of the target material used during the present term, P, is obtained from the following formula (1).

$$P = M + N - L \quad (1)$$

Then, a theoretical value Q of the amount of the target material used during the present term is obtained from the following formula (2), using a yield percentage Yr of the target item which is registered in advance.

$$Q = (p1 + p2 + p3 - p4)/Yr \quad (2)$$
$$= (p1 + p2 + p5)/Yr$$

Next, the amount P and the theoretical value Q are compared, and the registered yield percentage Yr is corrected or updated depending on an error which is obtained as a result of the comparison. Conventionally, the operations of obtaining the amount P and the theoretical value Q, comparing the amount P and the theoretical value Q, and correcting or updating the registered yield percentage Yr depending on the error obtained from the compared result, are basically made manually by an operator.

For example, a Japanese Laid-Open Patent Application No. 5-73573 proposes a conventional method of managing the yield percentage.

But conventionally, the yield percentage of the target processed products (items) with respect to the target raw material (material) is basically managed by a manual operation of the operator. For this reason, there were problems in that the operator must perform a troublesome operation and that it takes time to perform the troublesome operation.

In addition, in order to manage the yield percentage, it is necessary to use the amount M of initial stock of the target material, the buying amount N of the target material, and the amount L of final stock of the target material, in order to obtain the amount P of the target material used during the present term. Furthermore, it is also necessary to use the registered yield percentage Yr, the amount p1 of sold target items, the amount p2 of destroyed target items, and the amount p5 of stock of the target material which is obtained as a result of a stocktaking of the target items made during the present term (or the amount p3 of present stock of the target item and the amount p4 of initial stock of the target material which is obtained as a result of a previous stocktaking of the target items), in order to obtain the theoretical value Q of the amount of the target material used during the present term. Therefore, it was necessary to accurately manage the information M, N, L, p1, p2 and p5 (or p3 and p4). In general, the information M, N and L related to the material can be managed in relatively accurate and simple manner. However, in general, there was a problem in that a troublesome and time-consuming operation is required in order to accurately manage the information p1, p2 and p5 (or p3 and p4) related to the item.

On the other hand, if the information p1, p2 and p5 (or p3 and p4) related to the item is not accurately managed, the management of the yield percentage would have to rely on the operator's experience and perception. As a result, an accurate yield percentage cannot be obtained unless the operator is skilled, and the yield percentages obtained by different operators may differ greatly. Accordingly, there was a problem in that it is difficult to appropriately manage the yield percentage.

Moreover, when the operator corrects or updates the registered yield percentage Yr by obtaining the yield percentage, the correction or updating relies on the operator's experience and perception. Consequently, there was a problem in that it is impossible to appropriately correct or update the yield percentage unless the operator is skilled.

SUMMARY OF THE INVENTION

Accordingly, it is a general object of the present invention to provide a novel and useful yield percentage managing method, yield percentage managing apparatus and computer-readable storage medium, in which the problems described above are eliminated.

Another and more specific object of the present invention is to provide a yield percentage managing method, a yield percentage managing apparatus and a computer-readable storage medium, which can minimize management of information related to processed products, and accurately and automatically manage a yield percentage of the processed products with respect to raw materials without relying on an operator.

Still another object of the present invention is to provide a yield percentage managing method for managing a yield percentage of a target processed product with respect to at least one target raw material by use of a computer, comprising correcting or updating the yield percentage based on a processed amount K which indicates a total number or weight of target items of the target processed product processed from the target raw material. According to the yield percentage managing method of the present invention, it is possible to minimize management of information related to processed products, and accurately and automatically manage a yield percentage of the processed products with respect to raw materials without relying on an operator. Hence, it is possible to use the automatically managed yield percentage so as to optimize management of the purchasing budget, the ordering of the stock, the cost of the processed products and the like.

A further object of the present invention is to provide a yield percentage managing apparatus for managing a yield percentage of a target processed product with respect to at least one target raw material by use of a computer, comprising a control unit to correct or update the yield percentage based on a processed amount K which indicates a total number or weight of target items of the target processed product processed from the target raw material. According to the yield percentage managing apparatus of the present invention, it is possible to minimize management of information related to processed products, and accurately and automatically manage a yield percentage of the processed products with respect to raw materials without relying on an operator. Hence, it is possible to use the automatically managed yield percentage so as to optimize management of the purchasing budget, the ordering of the stock, the cost of the processed products and the like.

Another object of the present invention is to provide a measuring apparatus comprising means for generating measurement information which is obtained by measuring a target processed product which is processed from at least one target raw material, the measurement information including an amount of target items processed of the target processed product, a weight and a number of labels issued; means for inputting product information related to the target processed product to be subjected to a measurement and an issuance of a label, the product information includes a product code, a cost per unit weight and an amount of the target processed product; means for storing measuring apparatus master data based on the product code, the cost per unit weight and the amount of the target processed product, the measuring apparatus master data including information for generating labeling information which includes at least a product name; means for generating the labeling information to be indicated on the label of the target processed product, by referring to the measuring apparatus master data based on the product information; means for obtaining a processed amount which indicates a total number or amount of the target processed product that is processed, based on the measurement information; and means for outputting the product information, the measurement information and the processed amount with respect to the target processed product. According to the measuring apparatus of the present invention, it is possible to enable minimized management of information related to processed products, and accurate and automatic management of a yield percentage of the processed products with respect to raw materials without relying on an operator. Hence, it is possible to use the automatically managed yield percentage so as to optimize management of the purchasing budget, the ordering. of the stock, the cost of the processed products and the like.

Still another object of the present invention is to provide a network system having a server apparatus and a measuring apparatus coupled via a network, wherein: the measuring apparatus comprises means for generating measurement information by measuring a target processed product which is processed from a target raw material, means for inputting product information related to the target processed product which is to be subjected to a measurement and an issuance of a label, means for storing a measurement apparatus master data including information for generating labeling information, and means for obtaining a processed amount indicating a total amount or weight of the target processed product that is processed based on the measurement information; and the server apparatus corrects or updates a yield percentage of the target processed product with respect to the target raw material based on the processed amount which is obtained from the measuring apparatus via the network. According to the network system of the present invention, it is possible to minimize management of information related to processed products, and accurately and automatically manage a yield percentage of the processed products with respect to raw materials without relying on an operator. Hence, it is possible to use the automatically managed yield percentage so as to optimize management of the purchasing budget, the ordering of the stock, the cost of the processed products and the like.

A further object of the present invention is to provide a computer-readable storage medium which stores a program for causing a computer to manage a yield percentage of a target processed product with respect to a target raw material, the program comprising a procedure causing the computer to correct or update the yield percentage based on a processed amount K which indicates a total number or weight of target items of the target processed product processed from the target raw material. According to the computer-readable storage medium of the present invention, it is possible to minimize management of information related to processed products, and accurately and automatically manage a yield percentage of the processed products with respect to raw materials without relying on an operator. Hence, it is possible to use the automatically managed yield percentage so as to optimize management of the purchasing budget, the ordering of the stock, the cost of the processed products and the like.

Another object of the present invention is to provide a computer-readable storage medium which stores a program for causing a computer to function as a measuring apparatus, the program comprising a procedure causing the computer to generate measurement information which is obtained by measuring a target processed product which is processed from at least one target raw material, the measurement information including an amount of target items processed of the target processed product, a weight and a number of labels issued; a procedure causing the computer to input product information related to the target processed product to be subjected to a measurement and an issuance of a label, the product information includes a product code, a cost per unit weight and an amount of the target processed product; a procedure causing the computer to store measuring apparatus master data based on the product code, the cost per unit weight and the amount of the target processed product, the measuring apparatus master data including information for generating labeling information which includes at least a product name; a procedure causing the computer to generate the labeling information to be indicated on the label of the target processed product, by referring to the measuring apparatus master data based on the product information; a procedure causing the computer to obtain a processed amount which indicates a total number or amount of the target processed product that is processed, based on the measurement information; and a procedure causing the computer to output the product information, the measurement information and the processed amount with respect to the target processed product. According to the computer-readable storage medium of the present invention, it is possible to enable minimized management of information related to processed products, and accurate and automatic management of a yield percentage of the processed products with respect to raw materials without relying on an operator. Hence, it is possible to use the automatically managed yield percentage so as to optimize management of the purchasing budget, the ordering of the stock, the cost of the processed products and the like.

Other objects and further features of the present invention will be apparent from the following detailed description when read in conjunction with the accompanying drawings.

BRIEF DESCRIPTION OF THE DRAWINGS

FIG. 11 is a diagram for explaining a case where a number of materials and a number of items are in a 1:n relationship; and FIG. 12 is a diagram for explaining a case where the number of materials and the number of items are in a m:n relationship.

DESCRIPTION OF THE PREFERRED EMBODIMENTS

A description will be given of embodiments of a yield percentage managing method according to the present invention, a yield percentage managing apparatus according to the present invention and a computer-readable storage medium according to the present invention, by referring to FIG. 2 and the subsequent drawings.

Figure 2:
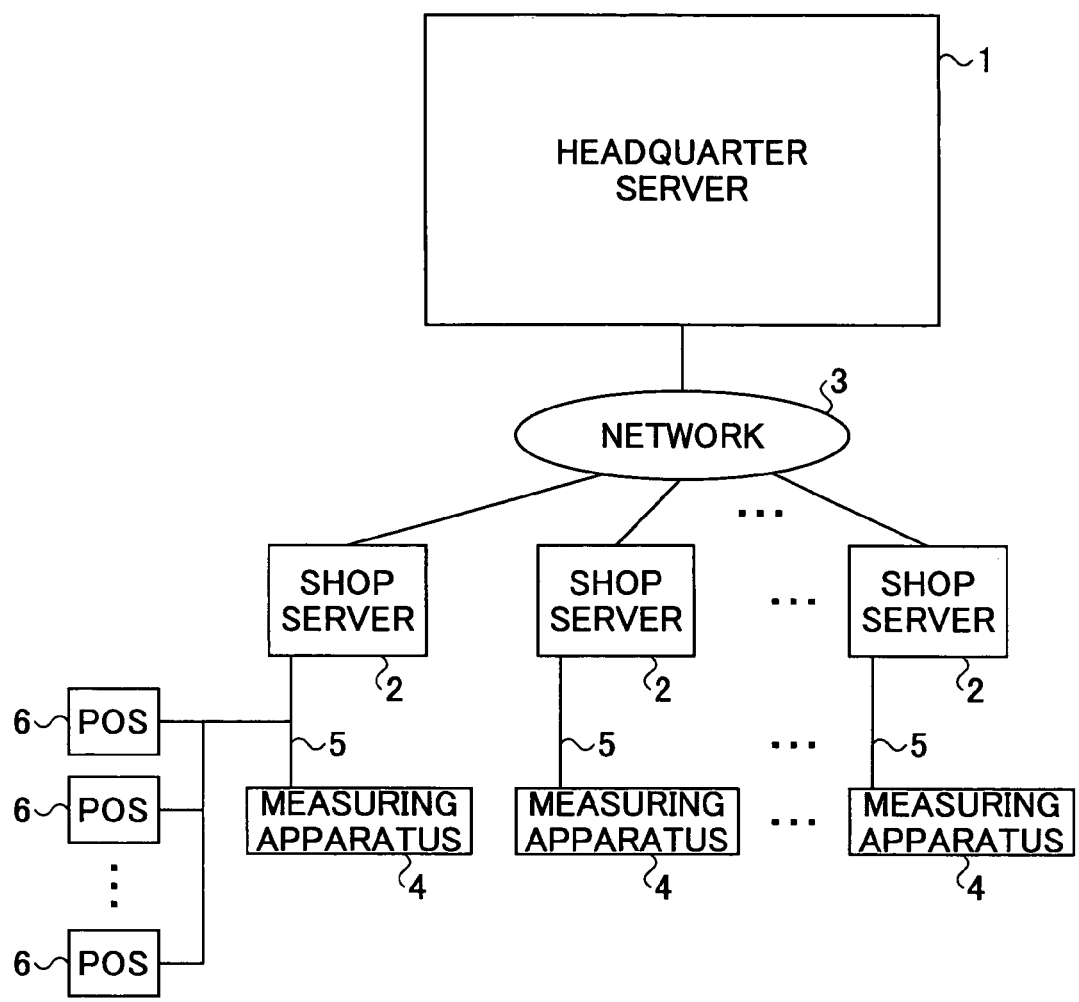
FIG. 2 is a system block diagram showing a structure of a network system to which the present invention may be applied.

FIG. 2 is a system block diagram showing a structure of a network system to which the present invention may be applied. The network system shown in FIG. 2 includes a headquarter server apparatus 1 and a plurality of shop server apparatuses 2 which are connected via a network 3, and a measuring apparatus 4 which is connected to a corresponding shop server apparatus 2 via a network 5, and a plurality of POS terminal equipments 6 which are connected to a corresponding shop server apparatus 2 via the network 5. For the sake of convenience, only the POS terminal equipments 6 provided with respect to one shop server apparatus 2 are shown in FIG. 2.

The headquarter server apparatus 1 is provided in a headquarter of a retailer, for example. The headquarter server apparatus 1 functions as a master server apparatus with respect to the plurality of shop server apparatuses 2. The headquarter server apparatus 1 centrally manages information managed by each of the shop server apparatuses 2, and carries out processes including accepting orders for raw materials and products from each of the shop server apparatuses 2 and performing corresponding delivery processes which are appropriate, and setting measuring apparatus master data to be used in common by all of the shops to the measuring apparatus 4 of each of the shops. The measuring apparatus master data includes information for generating at least labeling information such as the product name and the place of production of the product, which will be described later, based on the product code, the cost per unit weight (price), the amount of products and the like. The headquarter server apparatus 1 is formed by a known general purpose computer which includes a CPU, a communication unit, a storage unit and the like.

Each shop server apparatus 2 is provided in a corresponding shop of the retailer. The shop server apparatus 2 manages data M, N, L and the like, where M denotes an amount of initial stock of the target material (raw material), N denotes a buying amount of the target material, and L denotes an amount of final stock of the target material. The amount M of initial stock of the target material is obtained as a result of a previous stocktaking of the target material. The buying amount N of the target material is the amount of the bought target material which is allocated when the buying of the target material becomes definite. The amount L of final stock of the target material is the amount of the target material which is presently in stock as a result of the stocktaking of the target material. The shop server apparatus 2 also calculates and manages data P, Q and the like, where P denotes an amount of the target material used during the present term, and Q denotes a theoretical value of the amount of the target material used during the present term. The amount P of the target material used during the present term is the amount of the target material which is actually used to produce the target items. The shop server apparatus 2 further carries out management including correction (or updating) of the yield percentage of the target processed product (hereinafter also referred to as a target item) with respect to the target material, managing of a processed amount K indicating a total number (or weight) of the processed target items obtained from the measuring apparatus 4, setting of the measuring apparatus master data from the headquarter server apparatus 1 to the measuring apparatus 4, and tabulation of result data obtained from each POS terminal equipment 6 within the shop and indicating an amount of target items sold.

The network 3 is formed by one or a plurality of networks. The network 3 may be formed by a cable network, a wireless network or, a combination of cable and wireless networks. The network 3 may include a LAN, a WAN or the Internet. The network 5 may be formed by a cable network, a wireless network or, a combination of cable and wireless networks.

The measuring apparatus 4 is provided in a corresponding shop of the retailer. The measuring apparatus 4 generates product information and measurement information with respect to the target item, and manages the product and measurement information and sends the product and measurement information to the shop server apparatus 2 if necessary. The product information refers to the information related to the item which is to be subjected to the measurement and the label issuance. The product information includes the product code, the cost per unit weight (price), the amount of the product and the like which are input to the measuring apparatus 4 by the operator. By referring to the measuring apparatus master data which is set within the measuring apparatus 4, based on the product information, it is possible to generate the labeling information, such as the product name and the place of production of the product, to be printed on the label which is indicated on the target item. Accordingly, it is possible to identify the target item from the product information. On the other hand, the measurement information refers to the information which is obtained when the target item is measured by the measuring apparatus 4. The measurement information includes the amount (number) of target items processed (or packaged), the weight, the number of labels issued and the like. The measurement information is used to obtain the processed amount K which indicates the total number (or weight) of the processed target items.

The POS terminal equipment 6 is provided in a corresponding shop of the retailer. The POS terminal equipment 6 has a known structure including a function of calculating a total price of the products purchased by the customer by using a bar code reader to read bar codes indicated on each product purchased by the customer, for example, a function of automatically storing the result data of a past predetermined time (interval) with respect to each item, and a function of sending the stored result data to the shop server apparatus 2 at an arbitrary time. The result data indicates the amount (or number) of the target items sold. The result data can be obtained in the above described manner, because the bar code indicated on the product includes, in addition to the price information of the product, the identification information for identifying the product and the like. The sending of the result data from the POS terminal equipment 6 to the shop server apparatus 2 may be performed every time the result data is obtained (or updated), at predetermined time intervals or, every time an amount of the result data reaches a predetermined amount, for example. In addition, the shop server apparatus 2 may acquire the result data from each POS terminal equipment 6 which is connected thereto via the network 5, by polling each such POS terminal equipment 6 at an arbitrary timing.

Figure 3:
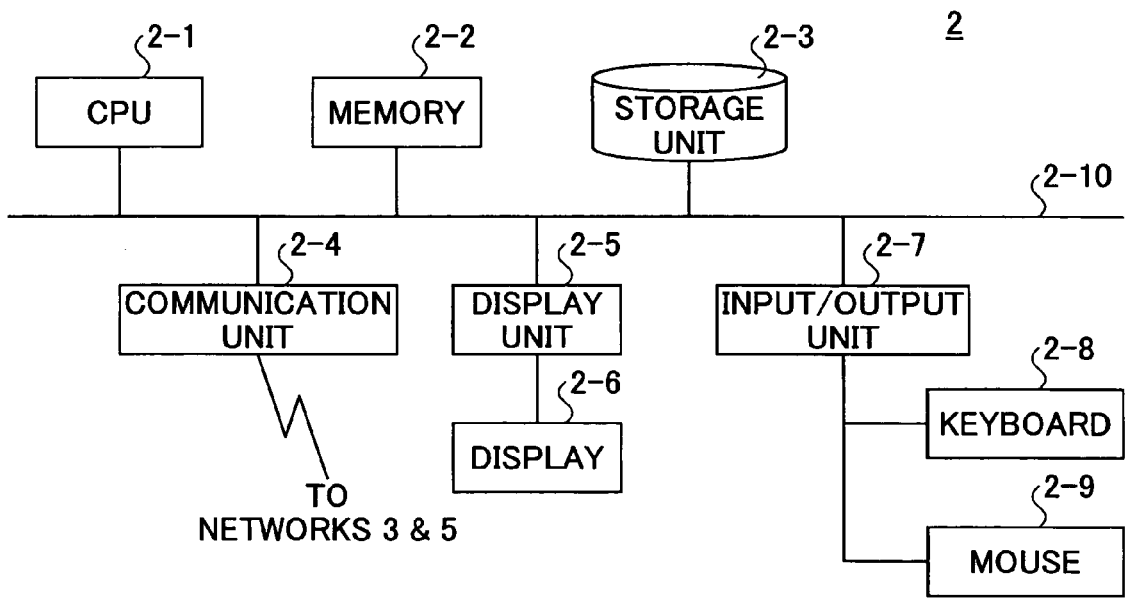
FIG. 3 is a system block diagram showing an embodiment of a shop server apparatus.

FIG. 3 is a system block diagram showing an embodiment of the shop server apparatus 2. As shown in FIG. 3, the shop server apparatus 2 includes a CPU 2-1, a memory 2-2, a storage unit 2-3, a communication unit 2-4, a display unit 2-6 and an input and output (input/output) unit 2-7 which are connected via a bus 2-10. A display 2-6 is connected to the display unit 2-5. A keyboard 2-8 and a mouse 2-9 are connected to the input/output unit 2-7. The shop server apparatus 2 may be formed by a known general purpose computer such as a personal computer.

The shop server apparatus 2 forms an embodiment of the yield percentage managing apparatus according to the present invention, and employs an embodiment of the yield percentage managing method according to the present invention. In addition, the CPU 2-1 executes a computer program which may be stored in an embodiment of the computer-readable storage medium according to the present invention. The computer program may be stored in a computer-readable recording medium such as the memory 2-2 and the storage unit 2-3 or, downloaded from another computer via the network 3. The computer-readable recording medium may be selected from a group of semiconductor memory devices, magnetic recording media, optical recording media and magneto-optical recording media, such as disks.

The CPU 2-1 controls the entire operation of the shop server apparatus 2. The memory 2-2 stores data such as intermediate data which are obtained when the CPU 2-1 carries out operations or computations. The storage unit 2-3 is formed by a hard disk drive (HDD) or the like, and stores programs to be executed by the CPU 2-1, and data such as the measuring apparatus master data and the result data. The communication unit 2-4 controls communications via the networks 3 and 5, under the control of the CPU 2-1. The display unit 2-5 displays various data and messages on the display 2-6, under the control of the CPU 2-1. The input/output unit 2-7 forms an interface for inputs to and outputs from the shop server apparatus 2. The inputs from the keyboard 2-8 and the mouse 2-9 are input to the CPU 2-1 via the input/output unit 2-7 and the bus 2-10. For the sake of convenience, the illustration of a printer is omitted in FIG. 3. However, when providing the printer to print the outputs of the shop server apparatus 2, the printer may be connected to the input/output unit 2-7. Of course, the basic structure of the shop server apparatus 2 is not limited to the basic structure shown in FIG. 3, and various other known basic structures may be employed instead.

Figure 4:
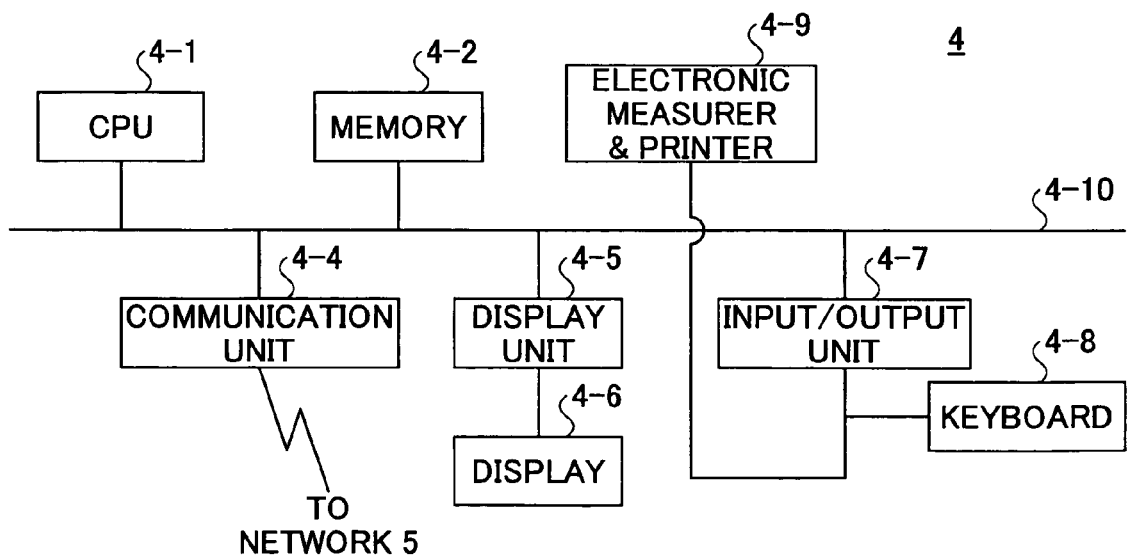
FIG. 4 is a system block diagram showing an embodiment of a measuring apparatus.

FIG. 4 is a system block diagram showing an embodiment of the measuring apparatus 4. As shown in FIG. 4, the measuring apparatus 4 includes a CPU 4-1, a memory 4-2, a communication unit 4-4, a display unit 4-6 and an input and output (input/output) unit 4-7 which are connected via a bus 4-10. A display 4-6 is connected to the display unit 4-5. A keyboard (or an operation panel) 4-8 and an electronic measurer and printer 4-9 are connected to the input/output unit 4-7. Basically, the measuring apparatus 4 has a basic structure formed by a general purpose computer such as a known personal computer having a communication function, with an additional measuring function.

The CPU 4-1 controls the entire operation of the measuring apparatus 4. The memory 4-2 stores programs to be executed by the CPU 4-1, and data such as the measuring apparatus master data and intermediate data which are obtained when the CPU 4-1 carries out operations or computations. The communication unit 4-4 controls communications via the network 5, under the control of the CPU 4-1. The display unit 4-5 displays various data and messages on the display 4-6, under the control of the CPU 4-1. The input/output unit 4-7 forms an interface for inputs to and outputs from the measuring apparatus 4. The inputs from the keyboard 4-8 are input to the CPU 4-1 via the input/output unit 4-7 and the bus 4-10. When the operator inputs the product information of the target item from the keyboard 4-8, the CPU 4-1 refers to the measuring apparatus master data stored in the memory 4-2 and generates the labeling information to be printed on the label which is indicated on the target item, such as the product name and the place of production of the product. The CPU 4-1 may be designed to be able to change the measuring apparatus master data stored in the memory 4-2 in response to an instruction from the keyboard 4-8.

The electronic measurer and printer 4-9 includes an electronic measurer and a printer. The electronic measurer measures the target item to obtain the measurement information, and inputs the measurement information to the CPU 4-1 via the input/output unit 4-7 and the bus 4-10. The printer prints the labeling information which is to be indicated on the product, on the label. The labeling information is generated by the CPU 4-1 from the product information input to the CPU 4-1 and the measuring apparatus master data stored in the memory 4-2, and the labeling information is input to the printer via the bus 4-10 and the input/output section 4-7. The labeling information which is printed on the label includes, in addition to the bar code described above, the product name, the place of production of the product, the weight of the product, the price, the cost per unit weight (price), the date, the expiration date and the like. Of course, the basic structure of the measuring apparatus 4 is not limited to that shown in FIG. 4, and various other known basic structures may be employed instead. For example, the basic structure of the measuring apparatus 4 may be made up of a measuring apparatus having a known basic structure for making measurements, and a communication function which enables the measuring apparatus to communicate with the shop server apparatus 2.

Figure 1:
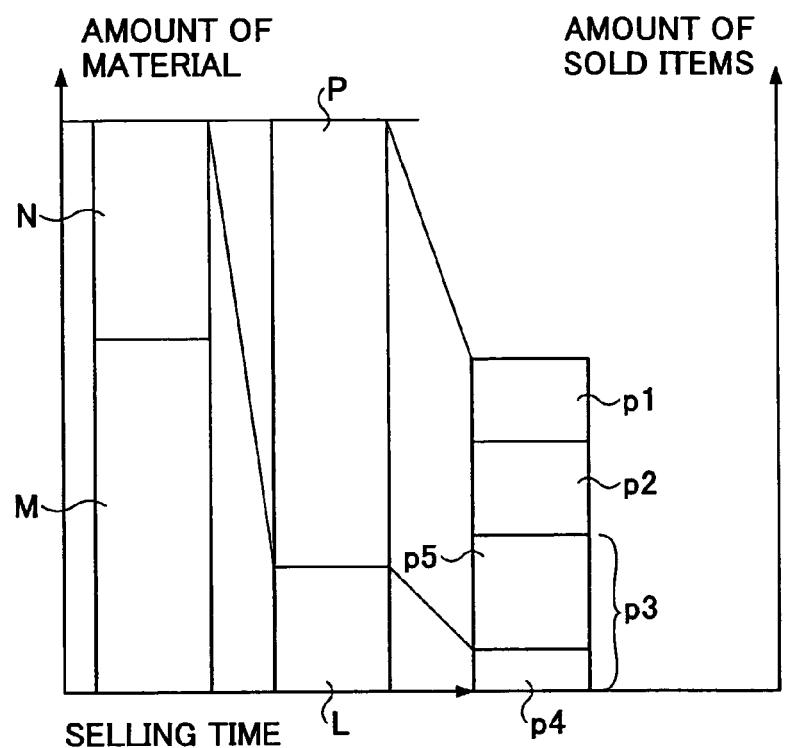
FIG. 1 is a diagram for explaining a conventional method of managing a yield percentage.
Figure 5:
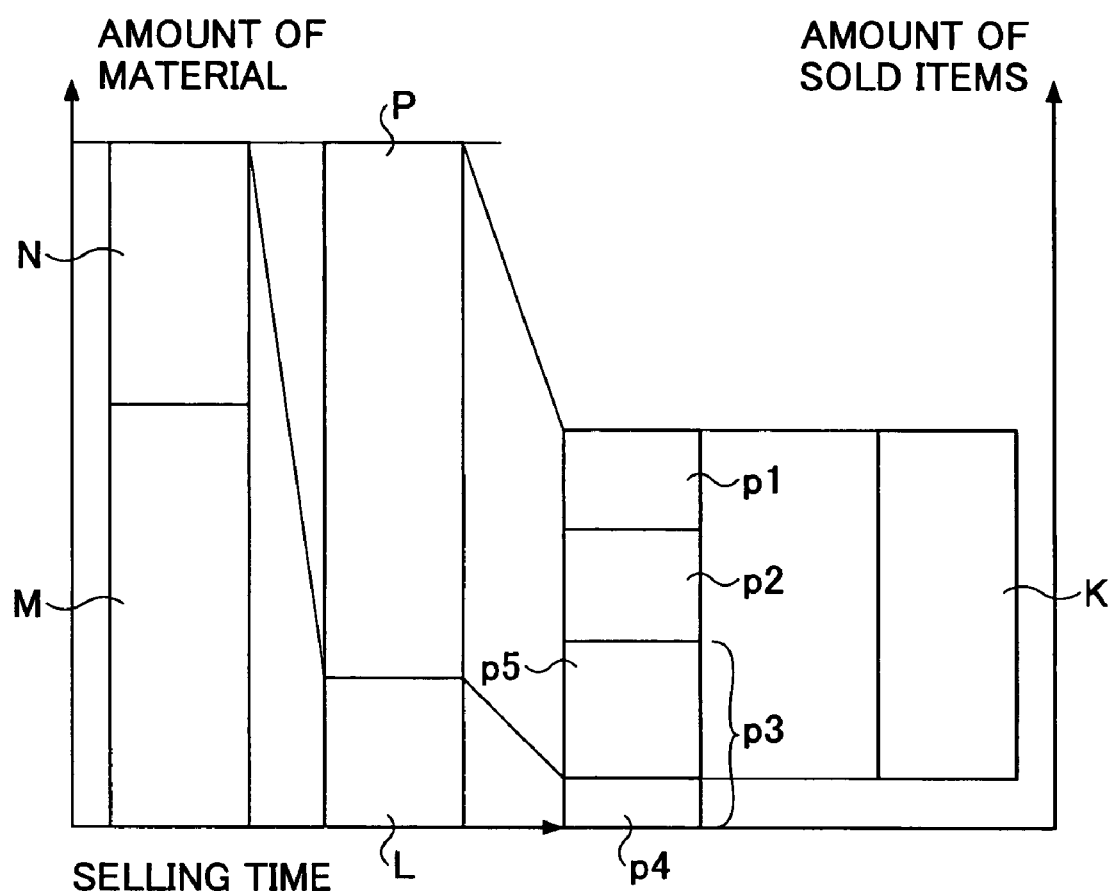
FIG. 5 is a diagram for explaining an embodiment of a yield percentage managing method according to the present invention.

FIG. 5 is a diagram for explaining this embodiment of the yield percentage managing method. In FIG. 5, those parts which are the same as those corresponding parts in FIG. 1 are designated by the same reference numerals, and a description thereof will be omitted. In FIG. 5, K denotes the processed amount indicating the total number (or weight) of the processed target items obtained from the measuring apparatus 4.

The yield percentage of the target item with respect to the target material is managed in the following manner. First, the CPU 2-1 obtains the amount P of the target material used during the present term based on the formula (1) described above, and obtains the theoretical value Q of the amount of the target material used during the present term based on the following formula (3), using the processed amount K indicating the total number (or weight) of the processed target items obtained from the measuring apparatus 4 and the yield percentage Yr of the target item registered in advance within the memory 2-2 or the storage unit 2-3 of the shop server apparatus 2. The yield percentage Yr is an initial value of the yield percentage which is registered in advance by the operator based on the operator's experience and the like, for example.

$$Q=K/Yr \qquad (3)$$

Next, the CPU 2-1 compares the amount P of the target material used and the theoretical value Q of the amount of target material used, and corrects or updates the registered yield percentage Yr depending on an error indicated by the compared result. For example, if a tolerance index is indicated by d%, a ratio P/Q of the amount P of the target material used and the theoretical value Q is monitored, and if this ratio P/Q does not satisfy the following condition (4), the yield percentage Yr (%) is corrected or updated so as to satisfy the condition (4).

$$(100\%-d\%)<(P/Q)<(100\%+d\%) \qquad (4)$$

The operation of obtaining the amount P of the target material used and the theoretical value Q, comparing the amount P and the theoretical value Q, and correcting or updating the registered yield percentage Yr depending on the error indicated by the compared result, can be automatically carried out by the CPU 2-1, without requiring the manual operations of the operator. In addition, if it is more desirable for the operator to at least partially carry out the correction or updating of the yield percentage Yr, a message urging the operator to correct or update the yield percentage Yr may be displayed on the display 2-6, so that the yield percentage Yr may be corrected or updated based on an instruction which is input by the operator.

Therefore, according to this embodiment, the theoretical value Q of the amount of the target material used during the present term is obtained from the formula (3) described above, and the formula (3) can be used to calculate the theoretical value Q based solely on the processed amount K and the yield percentage Yr. For this reason, unlike the conventional case described above, it is unnecessary to use the amount p1 of sold target items, the amount p2 of destroyed target items, and the amount p5 of stock of the target material which is obtained as a result of a stocktaking of the target items made during the present term (or the amount p3 of present stock of the target item (an amount of unsold target items which can be sold) and the amount p4 of initial stock of the target material which is obtained as a result of a previous stocktaking of the target items, in place of the amount p5). Hence, it is unnecessary to accurately manage the amounts p1, p2 and p5 (or the amounts p3 and p4 in place of the amount p5) for the purposes of managing the yield percentage.

Figure 6:
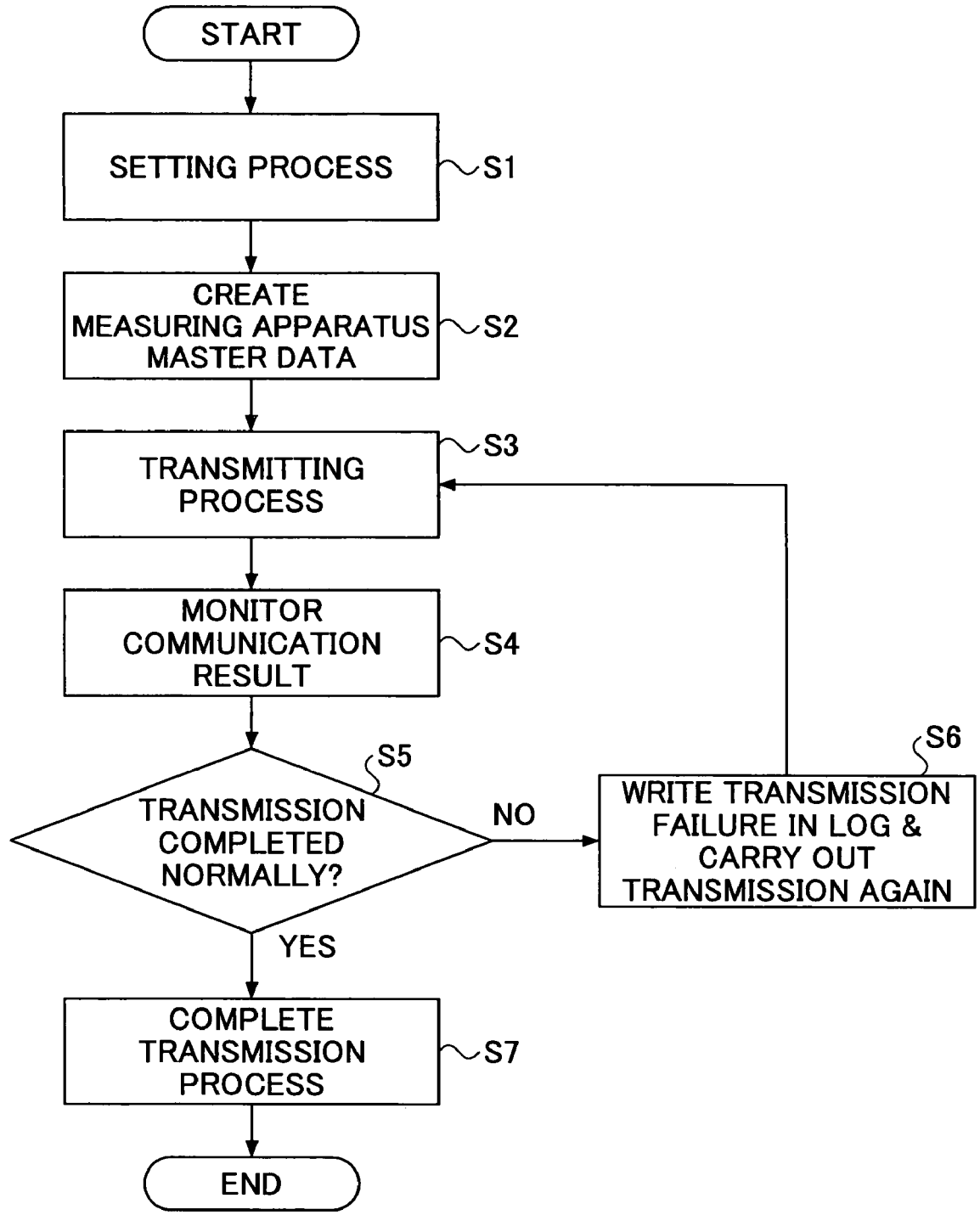
FIG. 6 is a flow chart for explaining an operation of a headquarter server apparatus.

Next, a description will be given of an operation of the headquarter server apparatus 1, by referring to FIG. 6. FIG. 6 is a flow chart for explaining an operation of the CPU within the headquarter server apparatus 1.

In FIG. 6, a step S1 starts a setting process for setting the measurement apparatus master data with respect to each measuring apparatus 4 connected to all shop server apparatuses 2 which are under management (or control) of the headquarter server apparatus 1. A step S2 creates the measuring apparatus master data. A step S3 starts a transmitting process for transmitting the created measuring apparatus master data with respect to all shop server apparatuses 2 which are under management of the headquarter server apparatus 1, at an arbitrary time. The start of the transmitting process may be triggered by an instruction from the operator of the headquarter server apparatus 1, triggered at predetermined time intervals or, triggered from each shop server apparatus 2. A step S4 monitors a response with respect to the transmitting process, which is received from each shop server apparatus 2 via the network 3, and monitors a communication result based on a transmission log or the like. A step S5 decides whether or not the transmitting process with respect to each shop server apparatus 2 is completed in a normal manner, based on the monitored communication result. If the decision result in the step S5 is NO, a step S6 writes, in the transmission log, information indicating that the transmission failed with respect to the shop server apparatus 2 to which the transmitting process was not completed in the normal manner, and the process returns to the step S3 so as to carry out the transmitting process again with respect to the shop server apparatus 2 to which the transmitting process was not completed in the normal manner. On the other hand, if the decision result in the step S5 is YES, a step S7 judges that the transmitting process with respect to all shop server apparatuses 2 which are under the management of the headquarter server apparatus 1 was completed in the normal manner, and the process ends.

Figure 7:
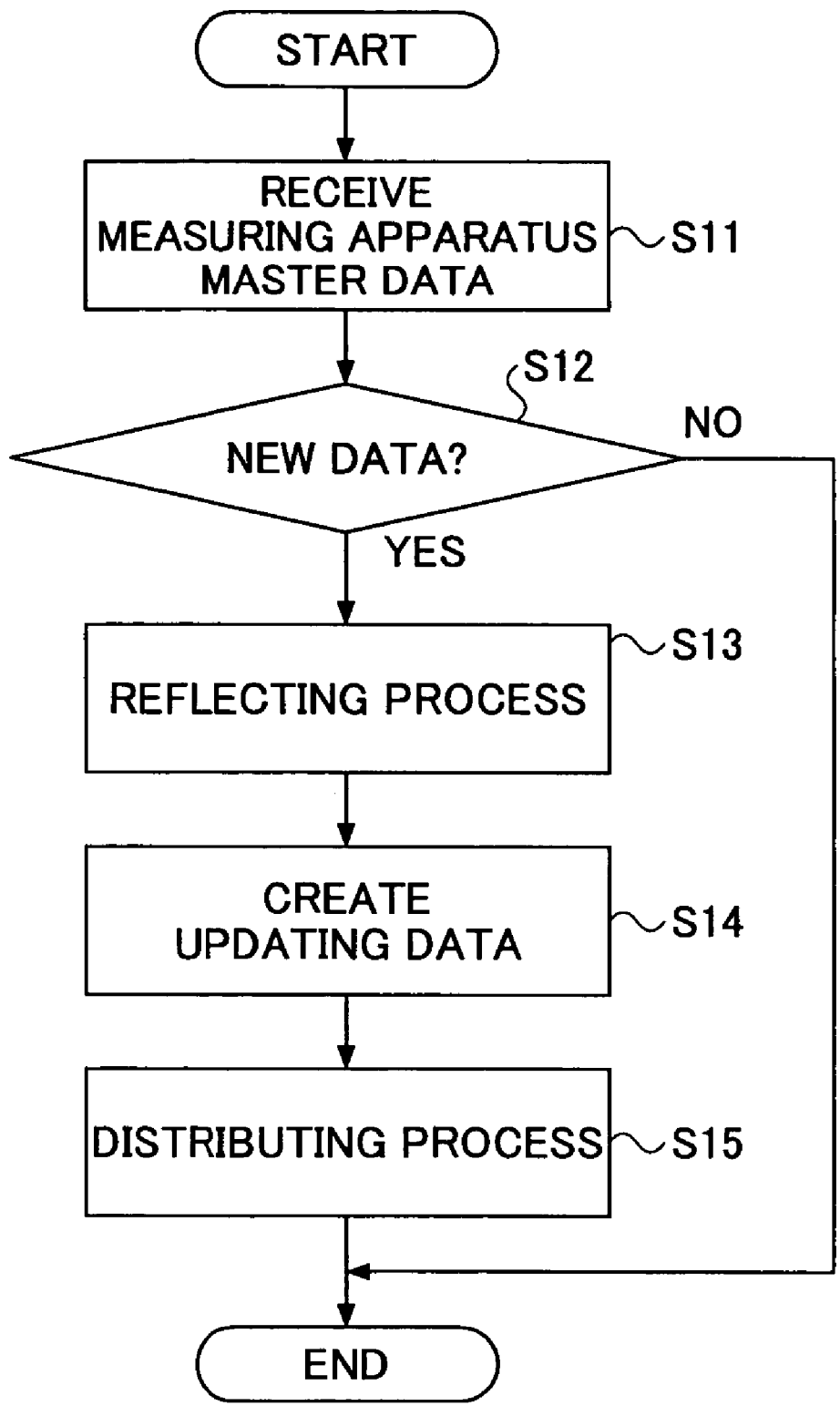
FIG. 7 is a flow chart for explaining an operation of the shop server apparatus.
Figure 8:
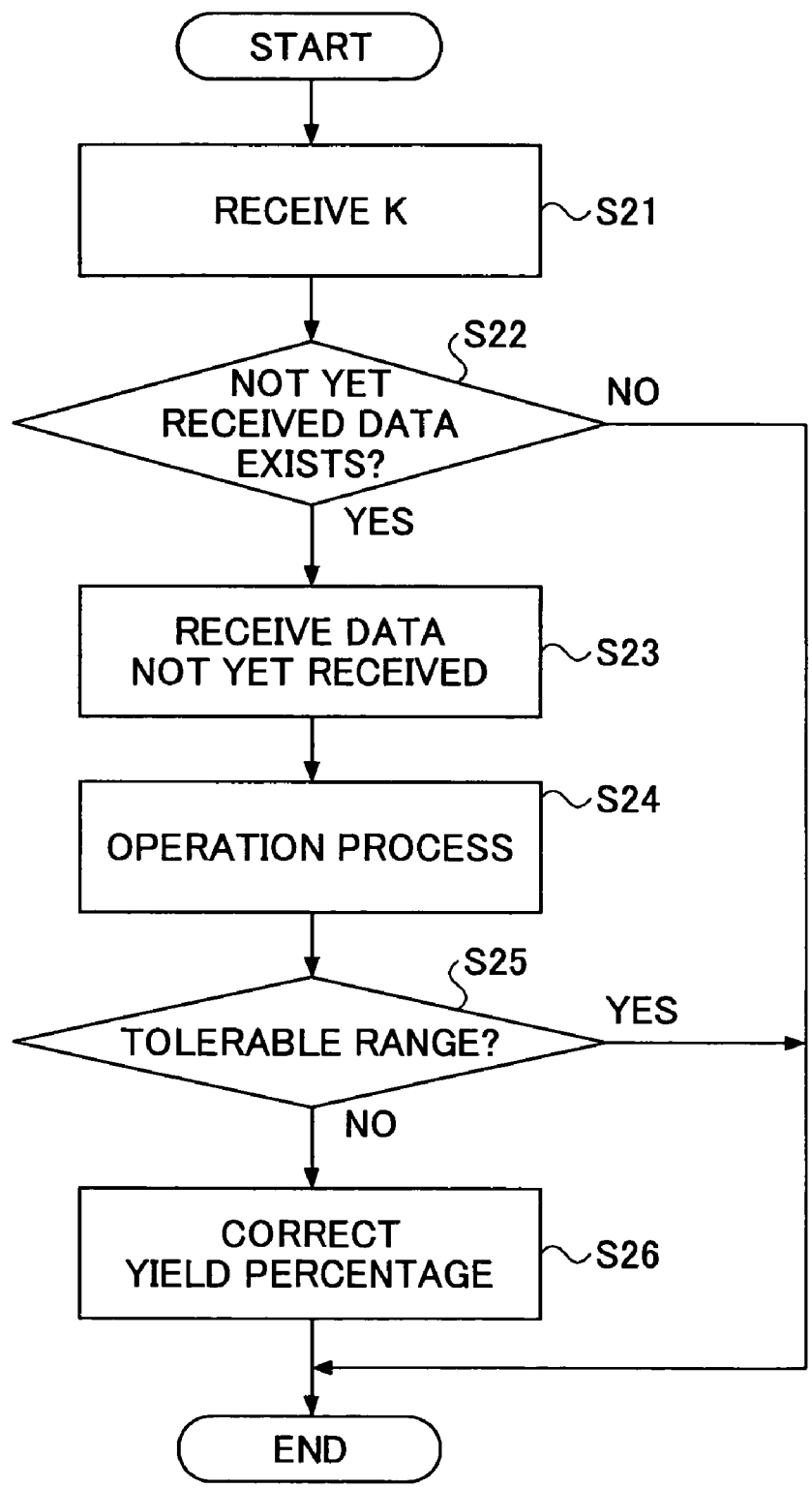
FIG. 8 is a flow chart for explaining an operation of the shop server apparatus.

Next, a description will be given of an operation of the shop server apparatus 2, by referring to FIGS. 7 and 8. FIGS. 7 and 8 are flow charts for explaining an operation of the CPU 2-1 within the shop server apparatus 2.

FIG. 7 shows a distributing process for distributing the measuring apparatus master data. In FIG. 7, a step S11 receives via the network 3 the measuring apparatus master data which is transmitted from the headquarter server apparatus 1 in the step S3 shown in FIG. 6. A step S12 decides whether or not the received measuring apparatus master data includes new measuring apparatus master data different from the measuring apparatus master data stored in the storage unit 2-3. The process ends if the decision result in the step S12 is NO. On the other hand, if the decision result in the step S12 is YES, a step S13 carries out a reflecting process for reflecting the new measuring apparatus master data to the stored measuring apparatus master data by storing the new measuring apparatus master data in the storage unit 2-3. A step S14 reads the measuring apparatus master data stored in the storage unit 2-3 after the reflecting process, and creates updating data for updating the measuring apparatus master data stored in the measuring apparatus 4. A step S15 carries out a distributing process for distributing the updating data to the measuring apparatus 4 via the network 5, and the process ends.

FIG. 8 shows a yield percentage managing process. In FIG. 8, a step S21 receives the processed amount K which indicates the total number (or weight) of the processed target items and is transmitted from the measuring apparatus 4 in a step S45 shown in FIG. 10 which will be described later, via the network 5 at an arbitrary time, and stores the processed amount K in the memory 2-2, for example. The processed amount K may be transmitted from the measuring apparatus 4 to the shop server apparatus 2 every time the target item is measured, at predetermined time intervals or, every time the value of the processed amount K reaches a predetermined value. In addition, the shop server apparatus 2 may acquire the processed amount K from the measuring apparatus 4 which is connected thereto via the network 5, by polling the measuring apparatus 4 at an arbitrary timing. A step S22 decides whether or not there are data which have not yet been received. The process ends if the decision result in the step S22 is NO.

On the other hand, if the decision result in the step S22 is YES, a step S23 receives the data which have not yet been received, that is, receives the processed amount K, and stores the processed amount K in the memory 2-2, for example. A step S24 carries out an operation (or computation) process described above in conjunction with FIG. 5. More particularly, the step S24 obtains the amount P of the target material used during the present term based on the formula (1) described above, and obtains the theoretical value Q of the amount of the target material used during the present term based on the formula (3) described above, using the processed amount K indicating the total number (or weight) of the processed target items obtained from the measuring apparatus 4 and the yield percentage Yr of the target item registered in advance within the memory 2-2 or the storage unit 2-3 of the shop server apparatus 2. A step S25 compares the amount P of the target material used and the theoretical value Q of the amount of target material used, and decides whether or not the ratio P/Q of the amount P of the target material used and the theoretical value Q satisfy the condition (4) described above, where the tolerance index is denoted by d%. If the decision result in the step S25 is YES, the process ends. On the other hand, if the decision result in the step S25 is NO, a step S26 corrects or updates the registered yield percentage Yr depending on an error indicated by the compared result so that the ratio P/Q satisfies the condition (4), and stores the corrected (or updated) yield percentage Yr in the memory 2-2 or the storage unit 2-3. The process ends after the step S26. Instead of correcting (or updating) the yield percentage Yr, the step S26 may display on the display 2-6 a message urging the operator to correct (or update) the yield percentage Yr, and correct (or update) the yield percentage Yr based on an instruction received from the operator.

Figure 9:
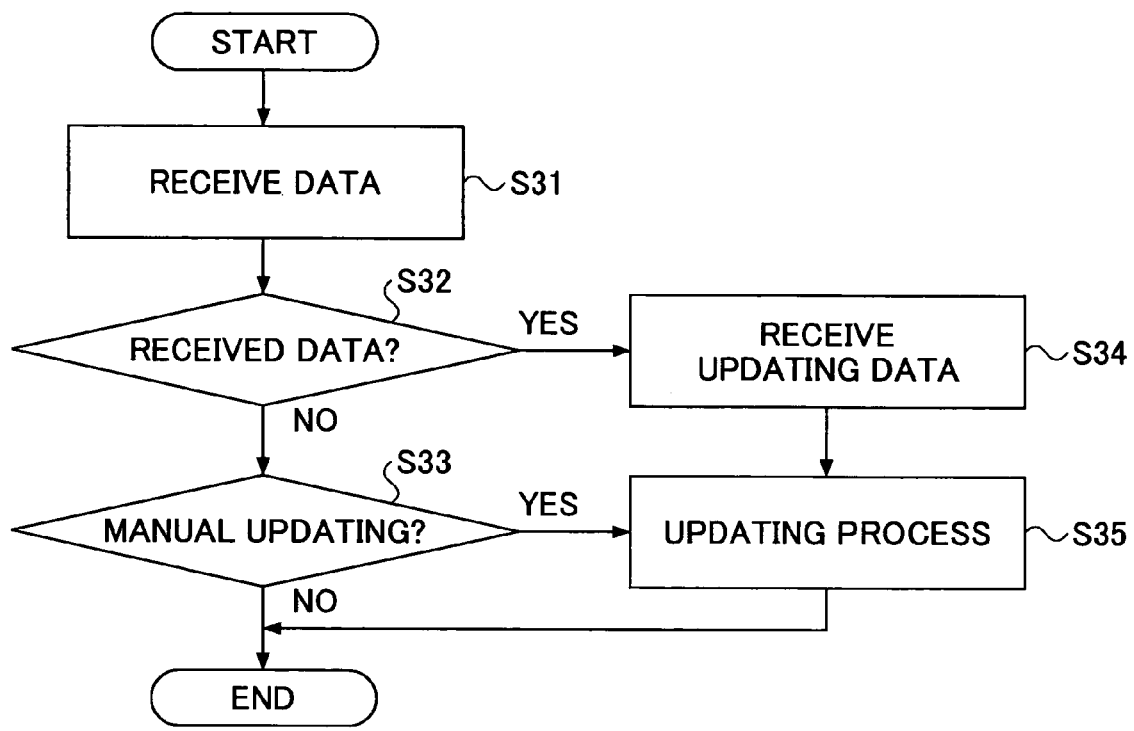
FIG. 9 is a flow chart for explaining an operation of the measuring apparatus.
Figure 10:
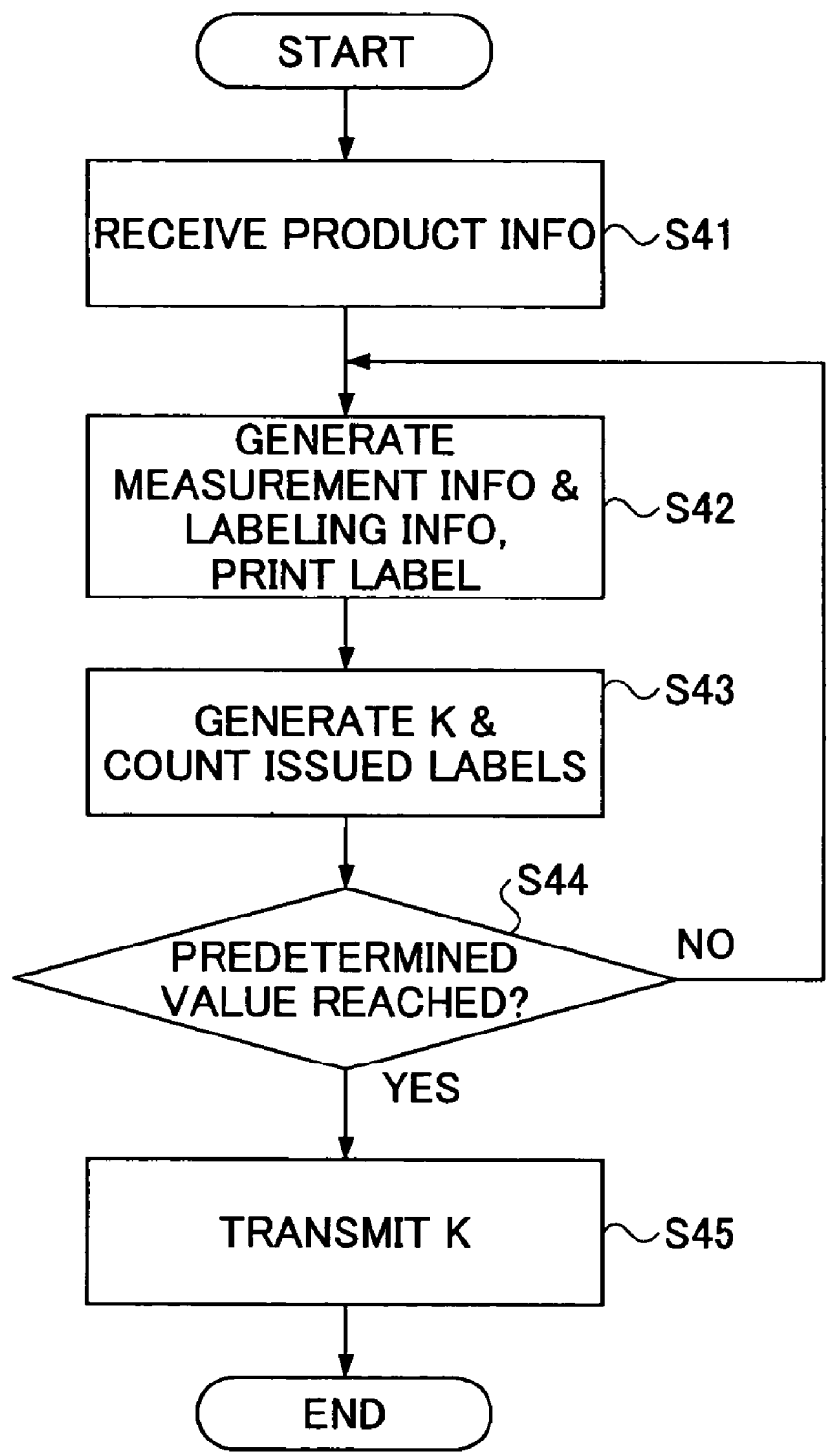
FIG. 10 is a flow chart for explaining an operation of the measuring apparatus.

Next, a description will be given of an operation of the measuring apparatus 4, by referring to FIGS. 9 and 10. FIGS. 9 and 10 are flow charts for explaining an operation of a CPU 4-1 of the measuring apparatus 4.

FIG. 9 shows an updating process for updating the measuring apparatus master data. It is assumed for the sake of convenience that the measuring apparatus master data which is set from the shop server apparatus 2 at the time of the initial setting is stored in the memory 4-1. In FIG. 9, a step S31 receives the data from the shop server apparatus 2 via the network 5. A step S32 confirms a reception state, and decides whether or not there is received data. If the decision result in the step S32 is NO, a step S33 decides whether or not a manual updating of the measuring apparatus master data is instructed by the operator. The process ends if the decision result in the step S33 is NO. On the other hand, if the decision result in the step S32 is YES, a step S34 receives the updating data distributed from the shop server apparatus 2 in the step S15 shown in FIG. 7. After the step S34 or if the decision result in the step S33 is YES, a step S35 carries out an updating process for updating the measuring apparatus master data by storing the updating data of the measuring apparatus master data in the memory 4-2, and the process ends. In a case where the step S34 is carried out, the updating data is obtained from the shop server apparatus 2. But in a case where the decision result in the step S33 is YES, the updating data is input from the keyboard 4-8 by the operator.

FIG. 10 shows a measuring process. In FIG. 10, a step S41 receives the product information input from the keyboard 4-8 by the operator, such as the product code, the cost per unit weight (price), and the amount of products, and stores the product information in the memory 4-1. A step S42 stores the measurement information which is measured by the electronic measurer and printer 4-9 in response to a measure instruction input from the keyboard 4-8 by the operator, such as the amount (number) of target items processed (or packaged), the weight, and the number of labels issued, in the memory 4-2. In addition, the step S42 refers to the measuring apparatus master data which is set in the memory 4-2, based on the product information, so as to generate the labeling information to be printed on the label indicated on the target item, such as the product name and the place of production of the product, and prints the labeling information on the label by the electronic measurer and printer 4-9.

A step S43 obtains the processed amount K which indicates the total number (or weight) of the processed target items based on the measurement information, counts the number of labels issued, and stores the processed amount K and the number of labels issued in the memory 4-2. A step S44 decides whether or not the processed amount K and/or the number of labels issued reached a predetermined value. The process returns to the step S42 if the decision result in the step S44 is NO. On the other hand, if the decision result in the step S44 is YES, a step S45 transmits the processed amount K to the shop server apparatus 2 via the network 5, and the process ends. The transmission of the processed amount K to the shop server apparatus 2 may be carried out every time the target item is measured, at predetermined time intervals or, every time the value of the processed amount K reaches a predetermined value. In addition, the shop server apparatus 2 may acquire the processed amount K from the measuring apparatus 4 which is connected thereto via the network 5, by polling the measuring apparatus 4 at an arbitrary timing, so that the measuring apparatus 4 outputs the processed amount K every time the measured apparatus 4 is polled.

In the embodiment described above, it is assumed for the sake of convenience that the target material and the target item are in a 1:1 relationship, that is, one kind of processed product is produced from one kind of raw material. However, the present invention is of course also applicable to a case where the target material and the processed items are in a 1:n relationship or, in a case where the target materials and the processed items are in a m:n relationship, where n and m are positive integers.

FIG. 11 is a diagram for explaining the case where the number of materials and the number of items are in a 1:n relationship. FIG. 11 shows a case where n=4, that is, a case where four kinds of processed items are produced from one kind of raw material. In this particular case, the one kind of raw material is tuna, and the four kinds of processed products are tuna slices, chutoro sashimi, otoro sashimi, and minced tuna. By carrying out the operation (or computation) process described above, the yield percentages with respect to the tuna (raw material) respectively are 90%, 80%, 85% and 98% for the tuna slices, the chutoro sashimi, the otoro sashimi, and the minced tuna.

FIG. 12 is a diagram for explaining the case where the number of materials and the number of items are in a m:n relationship. FIG. 12 shows a case where m=2 and n=1, that is, a case where one kind of processed item is produced from two kinds of raw materials. In this particular case, the two kinds of raw materials are squid and tuna, and the one kind of processed product is a sashimi plate of squid and tuna sashimis. A composition ratios of the squid and the tuna in the sashimi plate respectively are 40% and 60%. By carrying out the operation (or computation) process described above, the yield percentages with respect to the squid and the tuna (raw materials) respectively are 60% and 85% for the sashimi plate.

The amount P of the target material used during the present term may not only be obtained from the processed amount K which indicates the total number (or weight) of the processed target items of a single kind by the back calculation (or reverse operation), but may also be obtained from the processed amount K which indicates the total number (or weight) of the processed target items of a plurality of kinds by the back calculation (or reverse operation) based on the amounts of the raw materials used depending on the composition ratios. In this latter case, the yield percentage may be corrected (or updated) by taking into consideration the elements of the composition ratios. More particularly, with respect to the items with large processed amounts K, the yield percentage with respect to the raw material which is used with a high composition ratio should be the subject of the correction (or updating).

In order to manage the purchasing budget, the ordering of the stock, the cost of the processed products and the like, it is desirable to constantly correct or update the yield percentage to suit the situation. However, the yield percentage also changes depending on the individual worker or the number of workers who process the raw materials to produce the processed products. Accordingly, the yield percentage may further be optimized by correcting or updating the yield percentage depending on the number of workers and/or skill level (or experience) of the workers.

Since this embodiment automatically corrects or updates the yield percentages of the target processed products with respect to the target raw materials, it is possible to manage accurate yield percentages regardless of the operator. Furthermore, it is unnecessary for the operator to be skilled. Moreover, the yield percentage can be optimized within a short time.

In the embodiment described above, the present invention is applied to the processing of food products in the retailer. However, the present invention is of course similarly applicable to the correction or updating of the yield percentages of processed products (goods) with respect to raw materials which cannot be used 100% and converted into the processed products due to the properties, quality management and the like of the raw materials. For example, in a case where a semiconductor element is the raw material and the processed product is a circuit device, defective semiconductor elements and semiconductor elements which are damaged or destroyed during a production process due to accidents or the like are destroyed and not used for the production of the circuit device. Hence, it is important to correct or update the yield percentage in such a case, similarly to the case of the processed product such as the food product.

Further, the present invention is not limited to these embodiments, but various variations and modifications may be made without departing from the scope of the present invention.

What is claimed is:

1. A yield percentage managing method for managing a yield percentage of a target processed product with respect to at least one target raw material by use of a computer, comprising:

measuring the target processed product which is processed from the target raw material to obtain measurement information;

obtaining a processed amount K which indicates a total number or weight of target items of the target processed product based on the measurement information; and correcting or updating the yield percentage of the target processed product with respect to the target raw material based on the processed amount K.

2. The yield percentage managing method as claimed in claim 1, further comprising:

obtaining an amount of the yield percentage to be corrected or updated, based on an initial value of the yield percentage and the processed amount K.

3. A yield percentage managing method for managing a yield percentage of a target processed product with respect to at least one target raw material by use of a computer, comprising:

correcting or updating to correct or update the yield percentage based on a processed amount K which indicates a total number or weight of target items of the target processed product, processed from the target raw material;

performing a first calculation of an amount P of the target raw material used during a present term, from $P=M+N-L$, where M denotes an amount of initial stock of the target raw material, N denotes a buying amount of the target raw material, and L denotes an amount of final stock of the target raw material; and performing a second calculation of a theoretical value Q of the amount of the target raw material used during the present term, from $Q=K/Yr$, using the processed amount K and an initial value Yr of the yield percentage the target product, wherein the correcting or updating obtains a compared result by comparing the amount P of the target raw material used and the theoretical value Q, to automatically correct or update the initial value Yr depending on an error of the compared result.

4. The yield percentage managing method as claimed in claim 3, wherein said correcting or updating monitors a ratio P/Q of the amount P of the target raw material used and the theoretical value Q, and corrects or updates the initial value Yr (%) so as to satisfy a condition $(100\%-d\%)<(P/Q)<(100\%+d\%)$ of a tolerable range if the ratio P/Q does not satisfy the condition, where d % denotes a tolerance index.

5. A yield percentage managing apparatus for managing a yield percentage of a target processed product with respect to at least one target raw material by use of a computer, comprising:

an input part configured to receive measurement information from a measuring apparatus that measures the target processed product, which is processed from the target raw material, and a processed amount K, which indicates a total number or weight of target items of the target processed product, based on the measurement information; and a control unit to correct or update the yield percentage of the target processed product with respect to the target raw material based on the processed amount K.

6. The yield percentage managing apparatus as claimed in claim 5, wherein said control unit includes means for obtaining an amount of the yield percentage to be corrected or updated, based on an initial value of the yield percentage and the processed amount K.

7. A yield percentage managing apparatus managing a yield percentage of a target processed product with respect to at least one target raw material by use of a computer, comprising:

a control unit to correct or update the yield percentage based on a processed amount K which indicates a total number or weight of target items of the target processed product processed from the target raw material;

a first calculation unit to calculate an amount P of the target raw material used during a present term from $P=M+N-L$, where M denotes an amount of initial stock of the target raw material, N denotes a buying amount of the target raw material, and L denotes an amount of final stock of the target raw material; and a second calculation unit to calculate a theoretical value Q of the amount of the target raw material used during the present term from $Q=K/Yr$, using the processed amount K and an initial value Yr of the yield percentage of the target product, wherein said control unit includes a correction part configured to obtain a compared result by comparing the amount P of the target raw material used and the theoretical value Q, and for automatically correcting or updating the initial value Yr depending on an error of the compared result.

8. The yield percentage managing apparatus as claimed in claim 7, wherein said correction means monitors a ratio P/Q of the amount P of the target raw material used and the theoretical value Q, and corrects or updates the initial value Yr (%) so as to satisfy a condition $(100\%-d\%)<(P/Q)<(100\%+d\%)$ of a tolerable range if the ratio P/Q does not satisfy the condition, where d % denotes a tolerance index.

9. A computer-readable storage medium which stores a program for causing a computer to manage a yield percentage of a target processed product with respect to a target raw material, said program comprising:

an input procedure causing the computer to receive measurement information from a measuring apparatus that measures the target processed product which is processed from the target raw material, and a processed among K which indicates a total number or weight of target items of the target processed product, based on the measurement information; and a procedure causing the computer to correct or update the yield percentage of the target processed product with respect to the target raw material, based on the processed amount K.

10. The computer-readable storage medium as claimed in claim 9, wherein said program further comprises:

a procedure causing the computer to obtain an amount of the yield percentage to be corrected or updated, based on an initial value of the yield percentage and the processed amount K.

11. A computer-readable storage medium which stores a program for causing a computer to manage a yield percentage of a target processed product with respect to a target raw material, said program comprising:

a correcting or updating procedure causing the computer to correct or update the yield percentage based on a processed amount K which indicates a total number or weight of target items of the target processed product, processed from the target raw material;

a first calculation procedure causing the computer to calculate an amount P of the target raw material used during a present term from P=M+N−L, where M denotes an amount of initial stock of the target raw material, N denotes a buying amount of the target raw material, and L denotes an amount of final stock of the target raw material;

a second calculation procedure causing the computer to calculate a theoretical value Q of the amount of the target raw material used during the present term from Q=K/Yr, using the processed amount K and an initial value Yr of the yield percentage the target product; and the correcting or updating procedure causes the computer to obtain a compared result by comparing the amount P of the target raw material used and the theoretical value Q, and to automatically correct or update the initial value Yr depending on an error of the compared result.

12. The computer-readable storage medium as claimed in claim 11, wherein said correction procedure causes the computer to monitor a ratio P/Q of the amount P of the target raw material used and the theoretical value Q, and to correct or update the initial value Yr (%) so as to satisfy a condition (100%−d %)<(P/Q)<(100%+d %) of a tolerable range if the ratio P/Q does not satisfy the condition, where d % denotes a tolerance index.

* * * * *

UNITED STATES PATENT AND TRADEMARK OFFICE
CERTIFICATE OF CORRECTION

| | | |
|---|---|---|
| PATENT NO. | : 7,065,463 B2 | Page 1 of 1 |
| APPLICATION NO. | : 10/749550 | |
| DATED | : June 20, 2006 | |
| INVENTOR(S) | : Xin Zhang | |

It is certified that error appears in the above-identified patent and that said Letters Patent is hereby corrected as shown below:

Column 17, Line 2, change "among K" to --amount K--.

Signed and Sealed this

Seventh Day of November, 2006

JON W. DUDAS
*Director of the United States Patent and Trademark Office*